(12) United States Patent
Wang et al.

(10) Patent No.: US 10,375,395 B2
(45) Date of Patent: Aug. 6, 2019

(54) VIDEO PROCESSING APPARATUS FOR GENERATING COUNT TABLE IN EXTERNAL STORAGE DEVICE OF HARDWARE ENTROPY ENGINE AND ASSOCIATED VIDEO PROCESSING METHOD

(71) Applicant: MEDIATEK INC., Hsin-Chu (TW)

(72) Inventors: Sheng-Jen Wang, Tainan (TW); Yung-Chang Chang, New Taipei (TW); Chia-Yun Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 277 days.

(21) Appl. No.: 15/439,964

(22) Filed: Feb. 23, 2017

(65) Prior Publication Data

US 2017/0244967 A1    Aug. 24, 2017

Related U.S. Application Data

(60) Provisional application No. 62/299,067, filed on Feb. 24, 2016.

(51) Int. Cl.
| | |
|---|---|
| *H04N 19/13* | (2014.01) |
| *H04N 19/70* | (2014.01) |
| *G06F 13/28* | (2006.01) |
| *H04N 19/91* | (2014.01) |
| *H04N 19/42* | (2014.01) |

(52) U.S. Cl.
CPC ............ *H04N 19/13* (2014.11); *G06F 13/28* (2013.01); *H04N 19/42* (2014.11); *H04N 19/70* (2014.11); *H04N 19/91* (2014.11)

(58) Field of Classification Search
CPC ........ H04N 19/13; H04N 19/42; H04N 19/70; H04N 19/91; G06F 13/28
USPC ...................................... 375/240.01
See application file for complete search history.

(56) References Cited

U.S. PATENT DOCUMENTS

2014/0205012 A1    7/2014  Lee
2015/0334387 A1    11/2015 Wang

FOREIGN PATENT DOCUMENTS

| CN | 103096075 A | 5/2013 |
| TW | I348653 | 9/2011 |
| TW | I401958 | 7/2013 |

*Primary Examiner* — Nguyen T Truong
(74) *Attorney, Agent, or Firm* — Winston Hsu

(57) ABSTRACT

A video processing apparatus includes an external storage device, a hardware entropy engine, and a software execution engine. The hardware entropy engine performs entropy processing of a current picture, and further outputs count information to the external storage device during the entropy processing of the current picture. When loaded and executed by the software execution engine, a software program instructs the software execution engine to convert the count information into count table contents, and generate a count table in the external storage device according to at least the count table contents. The count table is referenced to apply a backward adaptation to a probability table that is selectively used by the hardware entropy engine to perform entropy processing of a next picture.

19 Claims, 13 Drawing Sheets

Prob_table

| Partition_mode |
| --- |
| Tx_mode |
| Intra_mode |
| Inter_mode related |
| Filter_mode |
| Ref_frame_mode |
| Motion vector related |

(A)

Prob_table_intra

| Partition_mode |
| --- |
| Tx_mode |
| Intra_mode |

VIDEO PROCESSING APPARATUS FOR GENERATING COUNT TABLE IN EXTERNAL STORAGE DEVICE OF HARDWARE ENTROPY ENGINE AND ASSOCIATED VIDEO PROCESSING METHOD

CROSS REFERENCE TO RELATED APPLICATIONS

This application claims the benefit of U.S. provisional application No. 62/299,067, filed on Feb. 24, 2016 and incorporated herein by reference.

BACKGROUND

The present invention relates to entropy encoding/decoding, and more particularly, to a video processing apparatus (e.g., a video encoder/decoder) for generating a count table in an external storage device of a hardware entropy engine (e.g., a hardware entropy encoder/decoder) and an associated video processing method.

The conventional video coding standards generally adopt a block based coding technique to exploit spatial and temporal redundancy. For example, the basic approach is to divide the whole source frame into a plurality of blocks, perform intra prediction/inter prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

A video decoder is used to perform an inverse operation of a video encoding operation performed by a video encoder. For example, an entropy encoder in the video encoder is used to generate an encoded bitstream, while an entropy decoder in the video decoder is used to decode the encoded bitstream. The arithmetic coding may be employed by the entropy encoder. Hence, the entropy encoder refers to a probability table to perform the entropy encoding, and the video decoder also refers to the same probability table to perform the entropy decoding. Since the video content is inherently non-stationary in nature, adaptation of the probability table to account for changing statistics is critical in each of the video encoder and the video decoder.

SUMMARY

One of the objectives of the claimed invention is to provide a video processing apparatus (e.g., a video encoder/decoder) for generating a count table in an external storage device of a hardware entropy engine (e.g., a hardware entropy encoder/decoder) and an associated video processing method.

According to a first aspect of the present invention, an exemplary video processing apparatus is disclosed. The exemplary video processing apparatus includes an external storage device, a hardware entropy engine, and a software execution engine. The hardware entropy engine is external to the external storage device. The hardware entropy engine is arranged to perform entropy processing of a current picture, and is further arranged to output count information to the external storage device during the entropy processing of the current picture. The software execution engine is external to the external storage device. When loaded and executed by the software execution engine, a software program instructs the software execution engine to convert the count information into count table contents, and generate a count table in the external storage device according to at least the count table contents, wherein the count table is referenced to apply a backward adaptation to a probability table that is selectively used by the hardware entropy engine to perform entropy processing of a next picture.

According to a second aspect of the present invention, an exemplary video processing method is disclosed. The exemplary video processing method includes: performing, by a hardware entropy engine, entropy processing of a current picture and outputting count information to an external storage device of the hardware entropy engine during the entropy processing of the current picture; and executing a software program to convert the count information into count table contents and generate a count table in the external storage device according to at least the count table contents, wherein the count table is referenced to apply a backward adaptation to a probability table that is selectively used by the hardware entropy engine to perform entropy processing of a next picture.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a diagram illustrating a complete probability table and a partial probability table according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
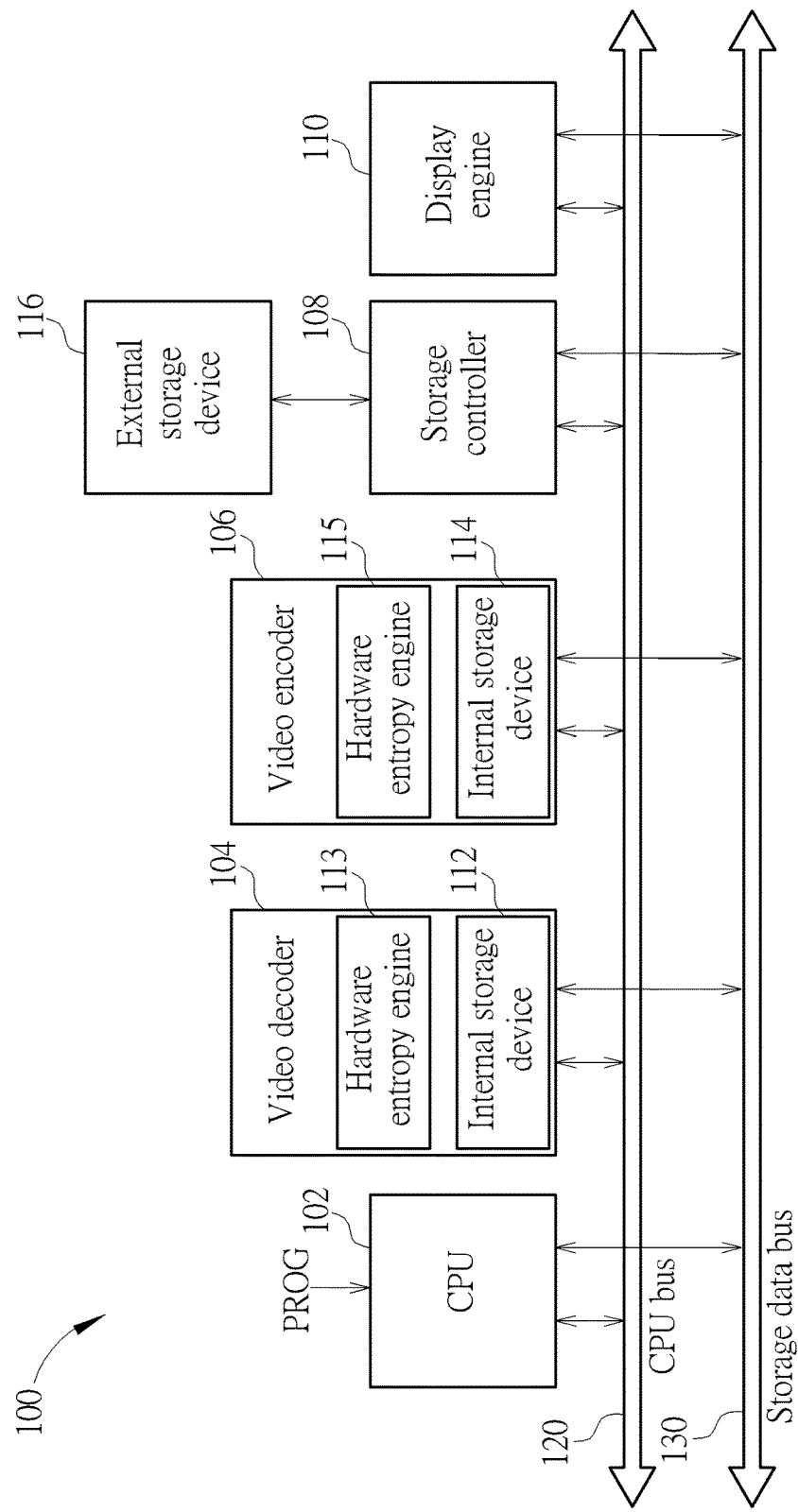
FIG. 1 is a block diagram illustrating a video processing system according to an embodiment of the present invention.

FIG. 1 is a block diagram illustrating a video processing system according to an embodiment of the present invention. The video processing system 100 includes a software execution engine (e.g., a central processing unit (CPU) 102), a plurality of video processing apparatuses (e.g., a video decoder 104 and a video encoder 106), a storage controller (e.g., a memory controller) 108, and a display engine (e.g., a display driving circuit) 110. The video decoder 104, video encoder 106, storage controller 108 and display engine 110 can communicate with the CPU 102 via a CPU bus 120. The CPU 102, video decoder 104, video encoder 106, and display engine 110 can communicate with the storage controller 108 via a storage data bus 108. The video decoder 104 supports an entropy decoding function, and the video encoder 106 supports an entropy encoding function. In this example, the video decoder 104 has a hardware entropy engine (e.g., a hardware entropy decoder) 113 and an internal storage device (e.g., an on-chip static random access memory (SRAM)) 112 accessible to the hardware entropy engine 113, and the video encoder 106 has a hardware entropy engine (e.g., a hardware entropy encoder) 115 and an internal storage device (e.g., an on-chip SRAM) 114 accessible to the hardware entropy engine 115. For example, the hardware entropy engine 113 and its internal storage device 112 may be implemented in the same chip, and the hardware entropy engine 115 and its internal storage device 114 may be implemented in the same chip. The external storage device 116 may be an off-chip dynamic random access memory (DRAM) external to the CPU 102, the video decoder 104 and the video encoder 106. Hence, concerning the video decoder 104 and the video encoder 106, the external storage device 116 is accessible to the hardware entropy engines 113 and 115 via the storage controller 108.

Concerning the video decoder 104, the hardware entropy engine 113 is arranged to perform entropy processing (i.e., entropy decoding) of a current picture, and is further arranged to output count information to the external storage device 116 during the entropy processing (i.e., entropy decoding) of the current picture. The CPU 102 serves as a software execution engine. When loaded and executed by the CPU 102, a software program PROG instructs the CPU 102 to convert the count information into count table contents, and generate a count table in the external storage device 116 according to at least the count table contents. In this embodiment, the count table generated for entropy decoding of the current picture is referenced to apply a backward adaptation to a probability table that is selectively used by the hardware entropy engine 113 to perform entropy processing (i.e., entropy decoding) of a next picture.

Concerning the video encoder 106, the hardware entropy engine 115 is arranged to perform entropy processing (i.e., entropy encoding) of a current picture, and is further arranged to output count information to the external storage device 116 during the entropy processing (i.e., entropy encoding) of the current picture. As mentioned above, the CPU 102 serves as a software execution engine. When loaded and executed by the CPU 102, the software program PROG instructs the CPU 102 to convert the count information into count table contents, and generate a count table in the external storage device 116 according to at least the count table contents. In this embodiment, the count table generated for entropy encoding of the current picture is referenced to apply a backward adaptation to a probability table that is selectively used by the hardware entropy engine 115 to perform entropy processing (i.e., entropy encoding) of a next picture.

To put it simply, the hardware entropy engine 115/113 does not create and store a count table (which is referenced to apply a backward adaptation to a probability table used by entropy encoding/decoding) in the internal storage device 114/112. Using the internal storage device 114/112 to store the count table needed for backward adaptation of the probability table is quite expensive. For example, when a count table is stored in the internal storage device 114/112, a storage space is allocated to store the count table that may have a table size of 12.2K bytes (i.e., 3066×32 bits). The present invention therefore proposes hardware and software partition optimization, such that a software engine (e.g., CPU 102) can create and store a count table (which is referenced to apply a backward adaptation to a probability table used by entropy encoding/decoding) in the external storage device 116 according to the proposed count information provided by a hardware engine (e.g., hardware entropy engine 115/113). Further details of the count information will be described later.

Figure 2:
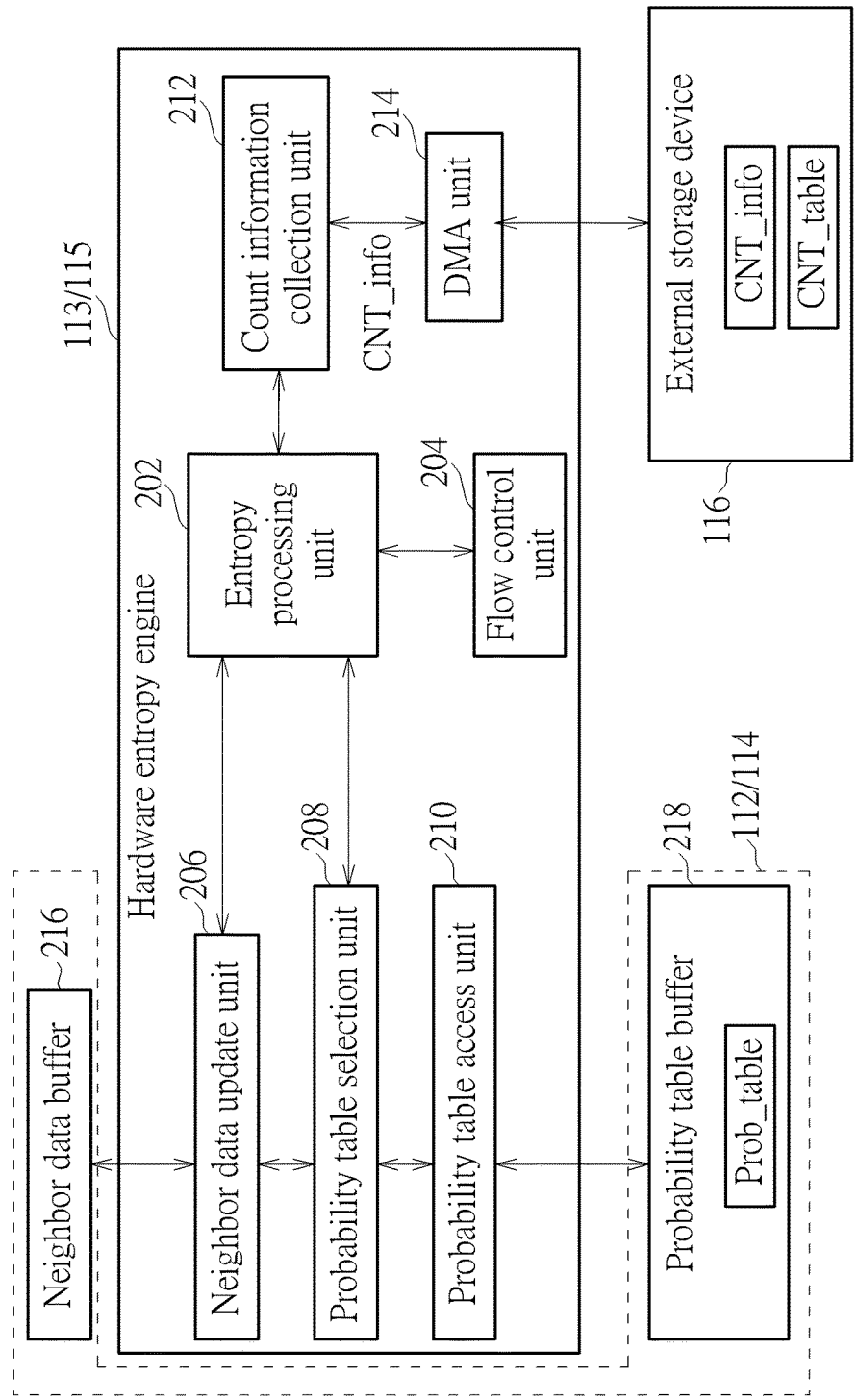
FIG. 2 is a diagram illustrating a block diagram of a hardware entropy engine according to an embodiment of the present invention.

FIG. 2 is a diagram illustrating a block diagram of a hardware entropy engine according to an embodiment of the present invention. Each of the hardware entropy engines 113 and 115 may be configured to employ the same hardware structure shown in FIG. 2. In this embodiment, the hardware entropy engine 115/113 includes a plurality of circuits, such as an entropy processing unit 202, a flow control unit 204, a neighbor data update unit 206, a probability table selection unit 208, a probability table access unit 210, a count information collection unit 212, and a direct memory access (DMA) unit 214. The internal storage device 114/112 dedicated to the corresponding hardware entropy engine 115/113 may have a neighbor data buffer 216 and a probability table buffer 218 allocated therein. The external storage device 116 is used to store the count information CNT_info provided by the hardware entropy engine 115/113 and a count table CNT_table that is generated by the software execution engine (e.g., CPU 102) based on count table contents converted from the count information CNT_info.

VP9 is an open and royalty-free video coding standard being developed by Google®. For clarity and simplicity, it is assumed that the hardware entropy engine 115/113 is arranged to perform entropy encoding/decoding compliant with a VP9 coding standard. However, this is for illustrative purposes only, and is not meant to be a limitation of the present invention. Any video encoder/decoder using the hardware entropy engine 115/113 (particularly, the proposed count information collection unit 212) falls within the scope of the present invention.

The probability table buffer 218 is used to store a probability table Prob_table that is used for syntax encoding/decoding. The neighbor data buffer 216 is used to store information of upper neighbor blocks that is referenced for probability model selection of the probability table Prob_table. The count table CNT_table stored in the external storage device 116 is generated based on the count information CNT_info collected by the count information collection unit 212 during the entropy processing (e.g., boolean encoding/decoding) of a current picture. For example, the count table CNT_table records actual counts for all encoded/decoded syntax in a current picture, and is referenced for backward adaptation of the probability table Prob_table. During the entropy encoding/decoding of the current picture, the DMA unit 214 may transmit the count information CNT_info collected by the count information collection unit 212 to the external storage device 116.

The flow control unit 204 controls the whole picture encode/decode flow. The entropy processing unit 202 is a core part of the hardware entropy engine 115/113. For example, the entropy processing unit 202 may perform mode processing, motion vector difference (MVD) processing, token processing, etc. The mode processing is used to encode/decode the mode-related syntax elements. The MVD processing is used to encode/decode the motion vector difference. The token processing is used to perform coefficient encoding/decoding to thereby encode/decode tokens. The probability table access unit 210 is an interface module used to access the probability table Prob_table stored in the probability table buffer 218. The neighbor data update unit 206 is used to perform neighbor data selection according to the syntax type and some syntax elements of a current block. The probability table selection unit 208 is used to refer to the neighbor information provided by the neighbor data update unit 206 to perform probability model selection for determining a probability model used by syntax entropy encoding/decoding such as mode processing, MVD processing, and token processing.

After the final count table CNT_table generated for entropy encoding/decoding of a current picture is available in the external storage device 116, the CPU 102 (particularly, the software program PROG running on the CPU 102) performs a backward probability update function to generate a new probability table (i.e., an updated probability table) according to syntax side information (e.g., syntax type), an old probability table (i.e., a current probability table Prob_table used) and the count table CNT_table.

Figure 3:
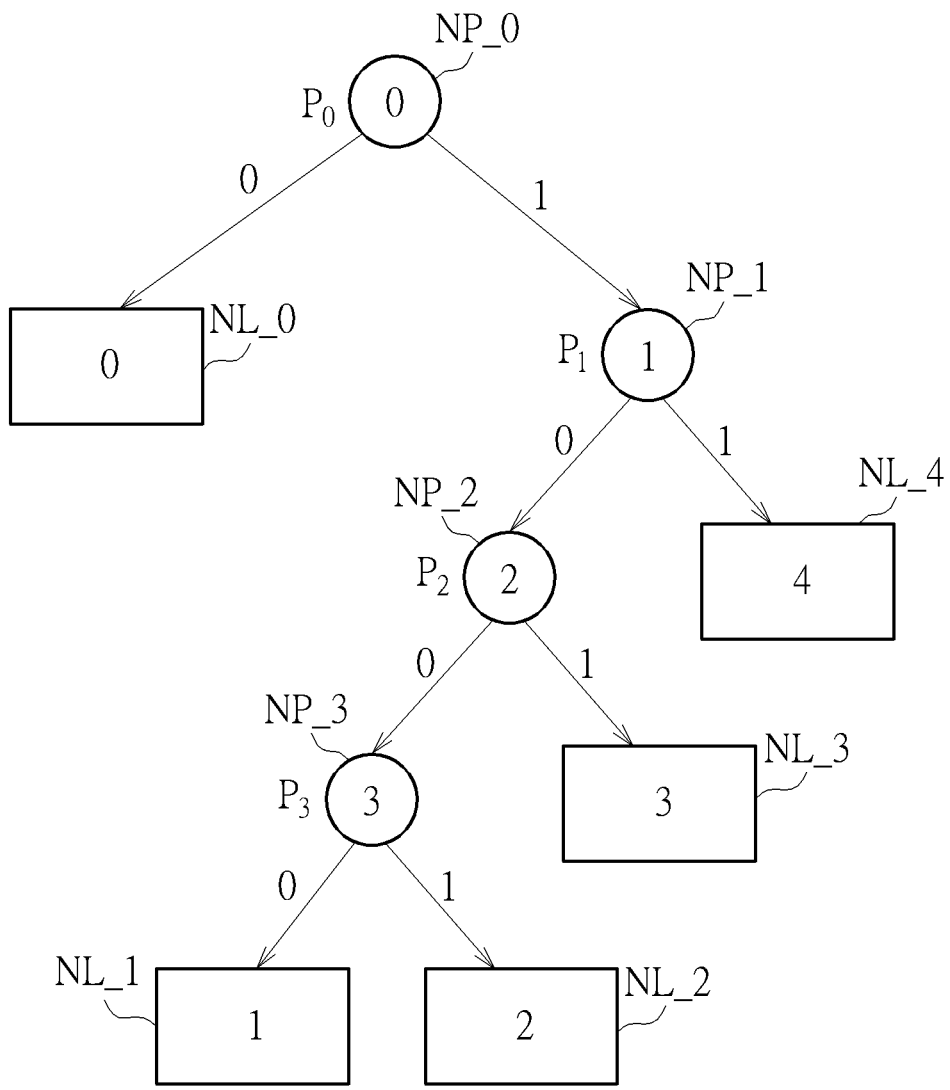
FIG. 3 is a diagram illustrating a binary tree created for a set of symbols according to an embodiment of the present invention.

Except for very few header bits that are encoded directly as raw values, the majority of compressed VP9 data values are encoded using a boolean arithmetic encoder acting as the underlying binary arithmetic encoder. Generally speaking, given a symbol from any n-ary alphabet, a static binary tree is constructed with (n−1) non-leaf nodes (or called parent nodes) and (n) leaf nodes, and the binary arithmetic encoder operates on each non-leaf node as the tree is traversed to encode a particular symbol (which may be one syntax setting of one context for a syntax type). FIG. 3 is a diagram illustrating a binary tree created for a set of symbols according to an embodiment of the present invention. In this example, there are 4 non-leaf nodes NP_0, NP_1, NP_2, NP_3 represented by circles, and 5 leaf nodes NL_0, NL_1, NL_2, NL_3, NL_4 represented by squares. Any symbol in the alphabet can be represented by a series of binary values generated by traversing the binary tree from the root node NP_0 to a corresponding leaf node. Each non-leaf node in the binary tree has a probability (e.g., $P_0, P_1, P_2, P_3$) assigned on the basis of the likelihood of taking the left (0) branch for traversing. The set of probabilities $P_0$-$P_3$ for encoding possible symbols of a specific syntax is referred to as an entropy coding context (or called probability model) of the specific syntax to be encoded. The video content is inherently non-stationary in nature and a critical element of any video encoder/decoder is the mechanism used to track the statistics of various symbols and update the entropy coding contexts (probability models) of symbols in the probability table to match the actual distribution of the symbols. For example, backward adaptation may be employed to update entropy coding contexts (probability models) at the end of encoding/decoding each picture. In other words, once all symbols in a current picture have been processed (e.g., encoded or decoded), a backward adaptation step is conducted to further update the probabilities for use in a next picture according to actual counts for each symbol in the current picture. Based on these actual counts, probabilities of various non-leaf nodes in a corresponding binary tree can be obtained. Take the binary tree shown in FIG. 3 as an example. For each of the non-leaf nodes NP_0-NP_3, information recorded in the count table can indicate the number of occurrence times of 0's and the number of occurrence times of 1's. Hence, based on count table information associated with all non-leaf nodes NP_0-NP_3, new values of the set of probabilities $P_0$-$P_3$ can be obtained and then used by the backward adaptation step to set updated values of the set of probabilities $P_0$-$P_3$ that may be selected for encoding/decoding the next picture.

As mentioned above, the count information collection unit 212 collects the count information CNT_info associated with syntax encoding/decoding performed by the entropy processing unit 202, and outputs the collected count information CNT_info to the external storage device 116 via the DMA unit 214; and the count table CNT_table (which is referenced for backward adaptation of the probability table Prob_table) is generated based on count table contents converted from the count information CNT_info. In one exemplary design, the software execution engine (e.g., CPU 102) does not start converting the count information CNT_info into the count table contents until the current picture is completely processed by the entropy processing (i.e., entropy encoding/decoding), where the count information CNT_info is full count information of the current picture that is collected by the count information collection unit 212 throughout the entropy processing procedure (i.e., entropy encoding/decoding procedure) of the current picture.

Figure 4:
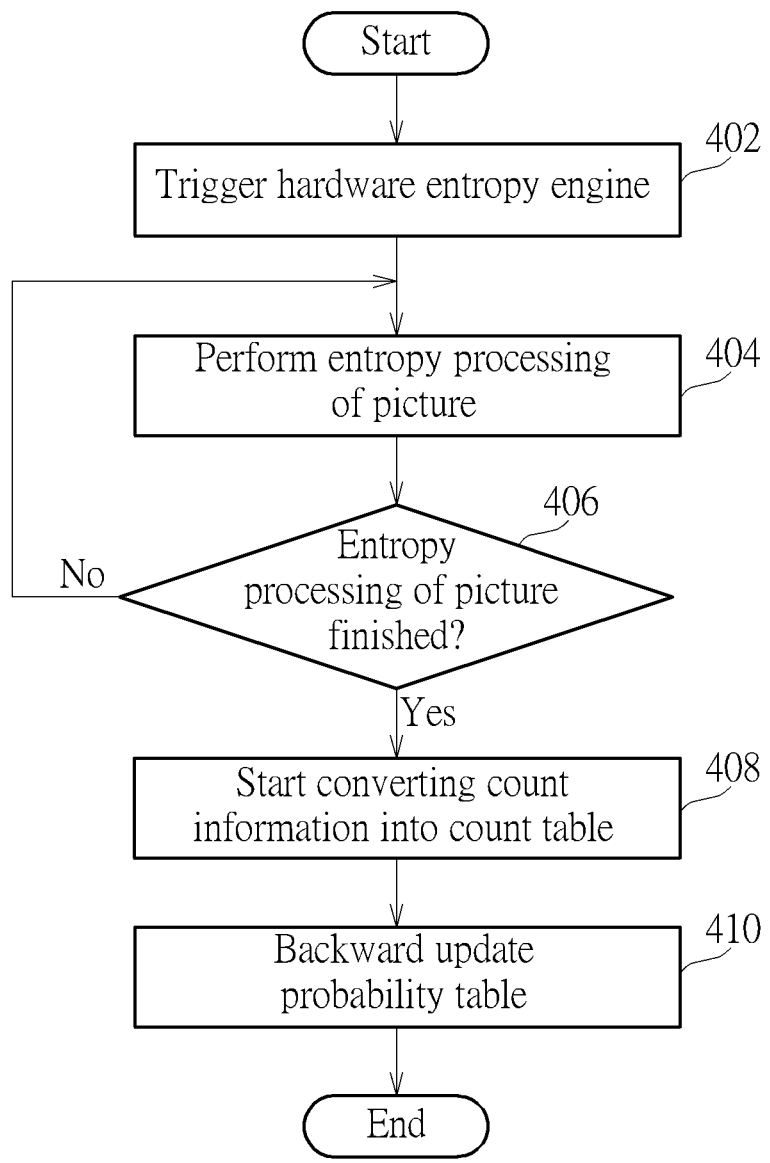
FIG. 4 is a flowchart illustrating a first backward probability table update method according to an embodiment of the present invention.

FIG. 4 is a flowchart illustrating a first backward probability table update method according to an embodiment of the present invention. Provided that the result is substantially the same, the steps are not required to be executed in the exact order shown in FIG. 4. At step 402, the hardware entropy engine 115/113 is triggered to start entropy processing of a picture. Hence, the flow control unit 204 instructs the entropy processing unit 202 to start entropy processing of the picture. At step 404, the entropy processing unit 202 performs entropy processing of the picture, and the count information collection unit 212 collects count information CNT_info generated from the entropy processing unit 202 during the entropy processing of the picture. At step 406, it is checked to judge if the entropy processing of the picture is finished. That is, the step 406 checks if the picture is completely entropy encoded/decoded. If the picture is not completely entropy encoded/decoded yet, the flow proceeds with step 404, such that the entropy processing unit 202 keeps performing entropy processing of the picture, and the count information collection unit 212 keeps collecting count information CNT_info associated with the entropy processing of the picture. If the picture is completely entropy encoded/decoded, the flow proceeds with step 408. At step 408, the CPU 102 (particularly, the software program PROG running on the CPU 102) starts converting the count information CNT_info (which is full count information of the picture) stored in the external storage device 116 into the count table CNT_table in the external storage device 116. In other words, the CPU 102 (particularly, the software program PROG running on the CPU 102) performs a count information conversion operation only once to thereby obtain the complete count table CNT_table of the picture. At step 410, the CPU 102 (particularly, the software program PROG running on the CPU 102) performs backward adaptation of the probability table Prob_table according to at least the count table CNT_table. For example, the external storage device 116 may have a working buffer allocated therein, such that the backward probability table update may use the working buffer to compute a new probability table (i.e., an updated probability table) based on an old probability table (i.e., the current probability table Prob_table used) and the count table CNT_table. After the updated probability table is computed, the updated probability table may be selectively loaded into the probability table buffer 218 of the internal storage device 114/112 for entropy processing of the next picture.

In another exemplary design, the software execution engine (e.g., CPU 102) starts converting the count information CNT_info into count table contents before a current picture is completely entropy processed, where the count information CNT_info is partial count information of the current picture and is collected by the count information collection unit 212 for entropy processing (i.e., entropy encoding/decoding) of a part of the current picture.

Figure 5:
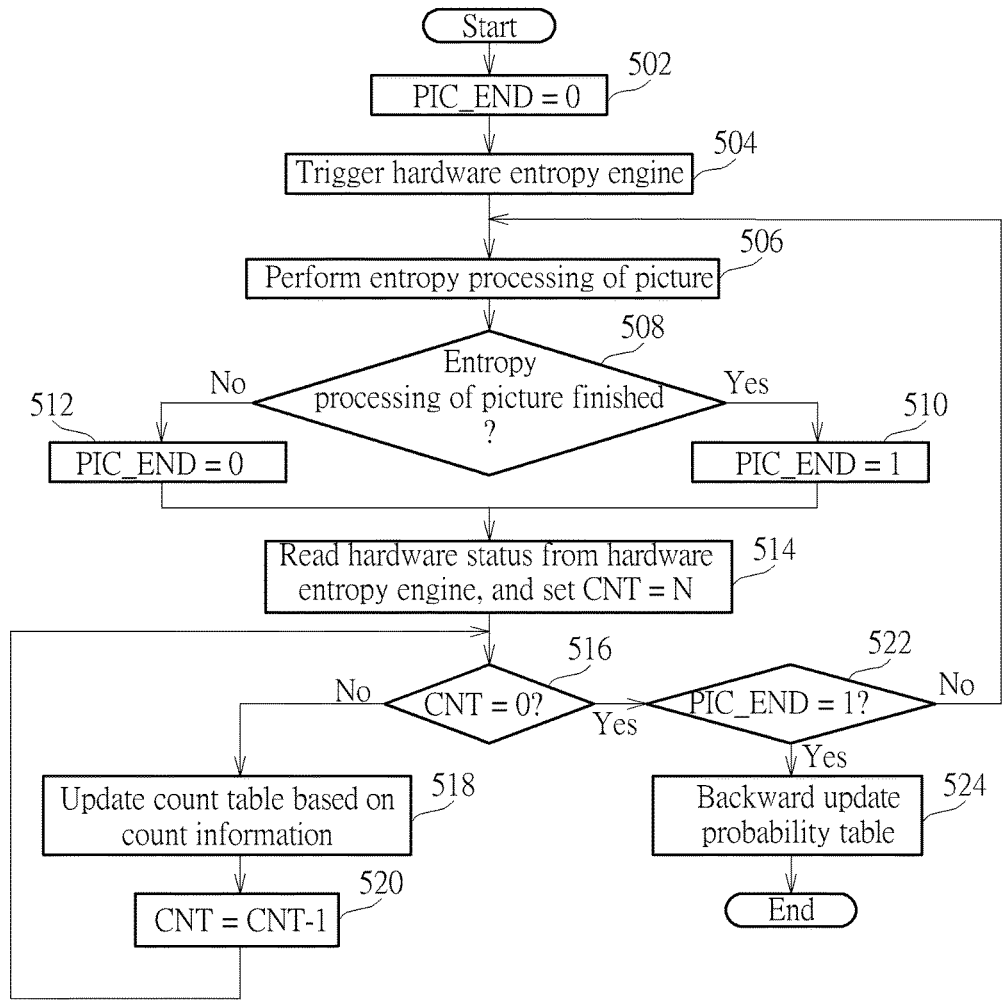
FIG. 5 is a flowchart illustrating a second backward probability table update method according to an embodiment of the present invention.

FIG. 5 is a flowchart illustrating a second backward probability table update method according to an embodiment of the present invention. Provided that the result is substantially the same, the steps are not required to be executed in the exact order shown in FIG. 5. At step 502, a control parameter PIC_END is initialized by a first value. For example, PIC_END=0. At step 504, the hardware entropy engine 115/113 is triggered to start entropy processing of a current picture. Hence, the flow control unit 204 instructs the entropy processing unit 202 to start entropy processing of the current picture. At step 506, the entropy processing unit 202 performs entropy processing of the picture, and also outputs count information CNT_info. In addition, the count information collection unit 212 collects the count information CNT_info and transits the collected count information CNT_info to the external storage device 116 during the entropy processing of the current picture. At step 508, it is checked to judge if the entropy processing of the current picture is finished. That is, step 508 checks if the current picture is completely entropy encoded/decoded. If the current picture is not completely entropy encoded/decoded yet, the control parameter PIC_END remains unchanged (i.e., PIC_END=0). If the current picture is completely entropy encoded/decoded, the control parameter PIC_END is updated by a second value. For example, PIC_END=1. At step 514, the CPU 102 (particularly, the software program PROG running on the CPU 102) gets a hardware status from the hardware entropy engine 115/113 (particularly, the entropy processing unit 202), wherein the hardware status is indicative of an amount of the count information CNT_info to be converted.

In one exemplary design, the CPU 102 (particularly, the software program PROG running on the CPU 102) performs a plurality of conversion iterations during the entropy processing of the current picture. In a case where PIC_END=0, the CPU 102 (particularly, the software program PROG running on the CPU 102) checks the hardware status to determine if the amount of the count information CNT_info to be converted reaches a predetermined value, and performs one of the conversion iterations to convert the count information CNT_info into count table contents when the amount of the count information CNT_info reaches the predetermined value. Hence, when PIC_END=0, a total number N of count information to be converted in one conversion iteration (which is not the last conversion iteration) is equal to the predetermined value, where the control parameter CNT is set by N at step 514.

In another case where PIC_END=1, the CPU 102 (particularly, the software program PROG running on the CPU 102) checks the hardware status to determine the amount of the remaining count information CNT_info to be converted, and performs the last conversion iteration to convert the remaining count information CNT_info into count table contents. Hence, when PIC_END=1, a total number N of count information to be converted in the last conversion iteration is equal to the amount of the remaining count information CNT_info to be converted, where the control parameter CNT is set by N at step 514.

Concerning generation of a count table for a current picture, all conversion iterations except the last conversion iteration are performed to convert the same number of count information CNT_info that is equal to the predetermined value, and the last conversion iteration is performed to convert the remaining count information CNT_info that is not converted yet. The control parameter CNT is initialized by N, and is used to indicate if conversion of the count information CNT_info for one conversion iteration is completed. At step 516, it is checked to judge if the control parameter CNT is equal to zero. If the control parameter CNT is not equal to zero yet, the flow proceeds with step 518. At step 518, the CPU 102 (particularly, the software program PROG running on the CPU 102) updates the count table CNT_table in the external storage device 116 by a conversion result of one of the count information CNT_info not converted yet. At step 520, the control parameter CNT is decreased by one to reflect the finish of the conversion of one of the count information CNT_info available in the external storage device 116, and the flow proceeds with step 516 to check if N conversion iterations have been performed to convert N count information CNT_info into the count table contents. If the control parameter CNT is equal to zero, the flow proceeds with step 522 to check if the control parameter PIC_END is set by the second value (e.g., PIC_END=1). When the control parameter PIC_END is still set by the first value (e.g., PIC_END=0), it means the picture is not completely entropy encoded/decoded yet. Hence, the flow proceeds with step 506. When the control parameter PIC_END is set by the second value (e.g., PIC_END=1), it means the picture is completely entropy encoded/decoded. Hence, the flow proceeds with step 524. At step 524, the CPU 102 (particularly, the software program PROG running on the CPU 102) obtains the probability table Prob_table currently used by the hardware entropy engine 115/113, and performs backward adaptation upon the probability table Prob_table according to the count table CNT_table that is generated by entropy encoding/decoding of the current picture, such that the updated probability table Prob_table may be selectively used by entropy encoding/decoding of the next picture.

In another exemplary design, the CPU 102 (particularly, the software program PROG running on the CPU 102) performs a plurality of conversion iterations during the entropy processing of the current picture. During each of the conversion iterations, the CPU 102 (particularly, the software program PROG running on the CPU 102) converts the count information CNT_info into count table contents regardless an amount of the count information CNT_info currently available to the conversion iteration. For example, the CPU 102 (particularly, the software program PROG running on the CPU 102) performs one conversion iteration periodically, such that the amount of the count information CNT_info to be converted in each conversion iteration may vary. At step 514, the CPU 102 (particularly, the software program PROG running on the CPU 102) checks the hardware status to determine the amount of the count information CNT_info available to the current conversion iteration. When PIC_END=0, a total number N of count information to be converted in one conversion iteration (which is not the last conversion iteration) is equal to the amount of the count information CNT_info indicated by the hardware status checked for the current conversion iteration, where the control parameter CNT is set by N at step 514. When PIC_END=1, a total number N of count information to be converted in the last conversion iteration is equal to the amount of the count information CNT_info indicated by the hardware status checked for the current conversion iteration (which is the last conversion iteration), where the control parameter CNT is set by N at step 514.

Concerning generation of a count table for a current picture, the control parameter CNT may be initialized by different values for different conversion iterations, including the last conversion iteration. The control parameter CNT is initialized by N, and is used to indicate if conversion of the count information CNT_info for one conversion iteration is completed. At step 516, it is checked to judge if the control parameter CNT is equal to zero. If the control parameter CNT is not equal to zero yet, the flow proceeds with step 518. At step 518, the CPU 102 (particularly, the software program PROG running on the CPU 102) updates the count table CNT_table in the external storage device 116 by a conversion result of one of the count information CNT_info not converted yet. At step 520, the control parameter CNT is decreased by one to reflect the finish of the conversion of one of the count information CNT_info available in the external storage device 116, and the flow proceeds with step 516 to check if N conversion iterations have been performed to convert N count information CNT_info into the count table contents. If the control parameter CNT is equal to zero, the flow proceeds with step 522 to check if the control parameter PIC_END is set by the second value (e.g., PIC_END=1). When the control parameter PIC_END is still set by the first value (e.g., PIC_END=0), it means the picture is not completely entropy encoded/decoded yet. Hence, the flow proceeds with step 506. When the control parameter PIC_END is set by the second value (e.g., PIC_END=1), it means the picture is completely entropy encoded/decoded. Hence, the flow proceeds with step 524. At step 524, the CPU 102 (particularly, the software program PROG running on the CPU 102) obtains the probability table Prob_table currently used by the hardware entropy engine 115/113, and performs backward adaptation upon the probability table Prob_table according to the count table CNT_table that is generated by entropy encoding/decoding of the current picture, such that the updated probability table Prob_table may be selectively used by entropy encoding/decoding of the next picture.

Figure 6:
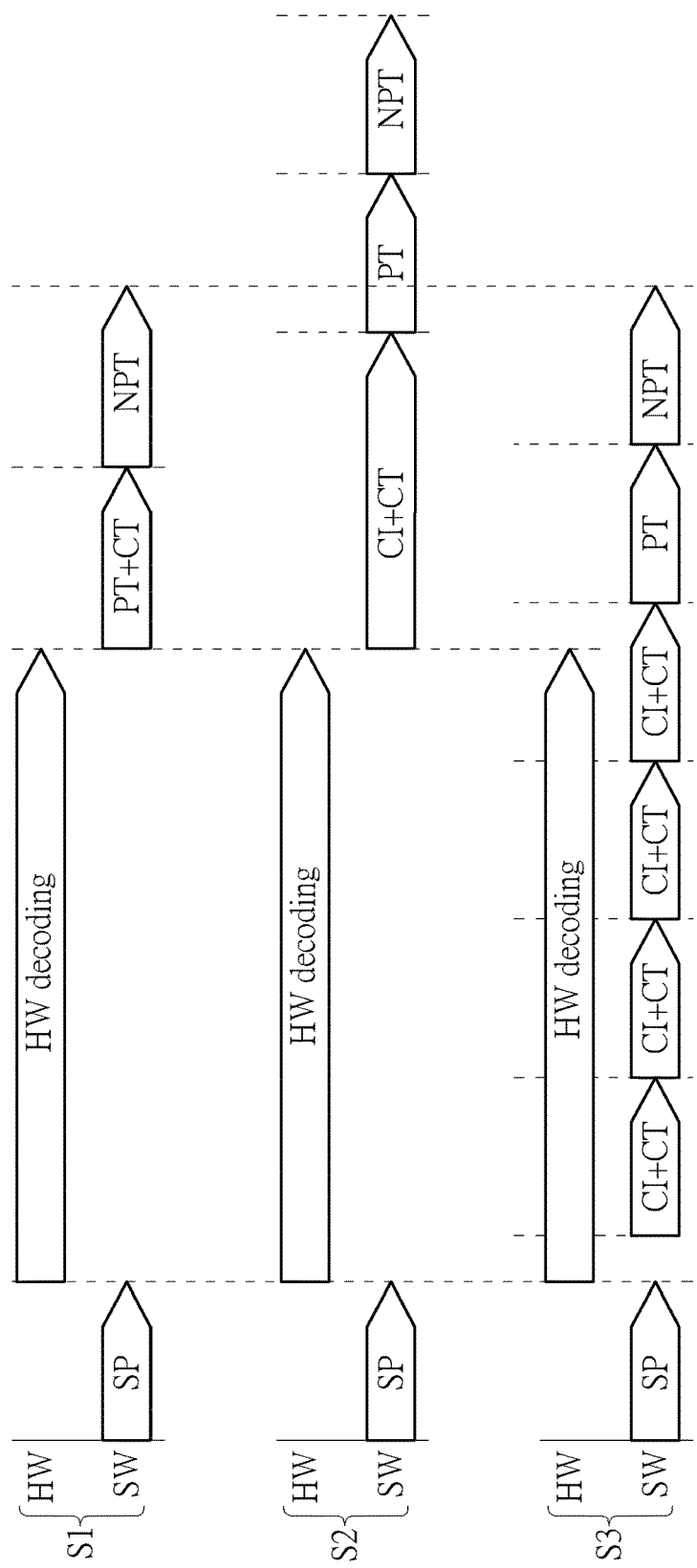
FIG. 6 is a diagram illustrating a comparison between a backward probability table update operation with a hardware-based count table maintenance design and a backward probability table update operation with a proposed hybrid count table maintenance design.

FIG. 6 is a diagram illustrating a comparison between a backward probability table update operation with a hardware-based count table maintenance design and a backward probability table update operation with a proposed hybrid count table maintenance design. For clarity and simplicity, it is assumed that the backward probability table update is performed at a video decoder. The top part S1 of FIG. 6 shows the backward probability table update operation with the hardware-based count table maintenance design. Hence, the software (SW) performs syntax parsing (denoted by "SP"), and then the hardware (HW) performs entropy decoding. It should be noted that the HW is also responsible for generating and storing a count table in an internal storage device of the HW according to the entropy decoding. After the entropy decoding of a picture is completed, a count table of the picture is available in the internal storage device of the HW. The SW gets both of an old probability table (denoted by "PT") and a count table (denoted by "CT") from the HW, and then generates a new probability table (denoted by "NPT") according to the obtained old probability table and count table.

The middle part S2 of FIG. 6 shows the backward probability table update operation with the proposed hybrid count table maintenance design shown in FIG. 4. The software (SW) performs syntax parsing (denoted by "SP"), and then the hardware (HW) performs entropy decoding. It should be noted that the HW is also responsible for generating count information (denoted by "CI") to an external storage device of the HW during the entropy decoding.

In one exemplary design as shown in the middle part S2 of FIG. 6, the HW does not need to generate and store a count table in an internal storage device of the HW. In this way, the cost of the HW (particularly, the cost of the internal storage device of the HW) can be effectively reduced. After the entropy decoding of a picture is completed, the SW gets the count information (denoted by "CI") from the external storage device, and generates a count table (denoted by "CT") of the picture in the external storage device according to the count information. Next, the SW gets an old probability table (denoted by "PT") from the HW, and then generates a new probability table (denoted by "NPT") according to the old probability table and the count table.

In an alternative design, the HW may reserve a portion of the internal storage device for storing a portion of a count table (e.g., one partial count table composed of a small number of count values that correspond to contexts and associated syntax settings for certain syntax type(s), such as MVD and/or mode), and a remaining portion of the count table (e.g., the other partial count table composed of a large number of count values that correspond to contexts and associated syntax settings for remaining syntax types, such as coefficient) is not needed to be stored in the internal storage device. Since the internal storage device only needs to store a small-sized partial count table rather than the whole count table, the cost of the internal storage device of the HW can be reduced. After the entropy decoding of a picture is completed, a small-sized partial count table is stored in the internal storage device. Hence, the SW gets the small-sized partial count table from the internal storage device, gets the count information from the external storage device, and generates the count table of the picture in the external storage device according to the small-sized partial count table and the count information, where the count table is obtained by combining the small-sized partial count table and a large-sized partial count table that is generated based on the count information. Next, the SW gets an old probability table from the HW, and then generates a new probability table according to the old probability table and the count table.

The bottom part S3 of FIG. 6 shows the backward probability table update operation with the proposed hybrid count table maintenance design shown in FIG. 5. Compared to the proposed hybrid count table maintenance design shown in FIG. 4, the proposed hybrid count table maintenance design shown in FIG. 5 has a shorter processing time. Ideally, the processing time needed for generating the count table by using the backward probability table update operation with the proposed hybrid count table maintenance design shown in FIG. 5 is equal to the processing time needed for generating the count table by using the backward probability table update operation with the hardware-based count table maintenance design. As shown in FIG. 6, the software (SW) performs syntax parsing, and then the hardware (HW) performs entropy decoding. It should be noted that the HW is also responsible for generating count information (denoted by "CI") to an external storage device of the HW during the entropy decoding. Specifically, the SW performs multiple conversion iterations during the entropy decoding of one picture, where the amounts of count information converted in all conversion iterations except the last conversion iteration may be the same or the amounts of count information converted in different conversion iterations, including the last conversion iteration, may be different.

In one exemplary design shown in the bottom part S3 of FIG. 6, the HW does not need to generate and store a count table in an internal storage device of the HW. The count table (denoted by "CT") is updated by the count information (denoted by "CI") in each of the conversion iterations. In this way, the processing time required to generate the count table for one picture can be reduced due to the parallel processing of the HW-based entropy decoding and the SW-based count table updating. As shown in FIG. 6, after the entropy decoding of a picture is completed, the count table is ready soon. Next, the SW gets an old probability table (denoted by "PT") from the HW, and then generates a new probability table (denoted by "NPT") according to the old probability table and the count table.

In an alternative design, the HW may reserve a portion of the internal storage device for storing a portion of a count table (e.g., one partial count table composed of a small number of count values that correspond to contexts and associated syntax settings for certain syntax type(s), such as MVD and/or mode), and a remaining portion of the count table (e.g., the other partial count table composed of a large number of count values that correspond to contexts and associated syntax settings for remaining syntax types, such as coefficient) is not needed to be stored in the internal storage device. Since the internal storage device only needs to store a small-sized partial count table rather than the whole count table, the cost of the internal storage device of the HW can be reduced. A large-sized partial count table is updated by the count information in each of the conversion iterations. In this way, the processing time required to generate the large-sized partial count table can be reduced due to the parallel processing of the HW-based entropy decoding and the SW-based partial count table updating. After the entropy decoding of a picture is completed, the large-sized partial count table is ready soon. The SW gets the small-sized partial count table from the internal storage device, and generates a count table of the picture in the external storage device by combining the small-sized partial count table and the large-sized partial count table. Next, the SW gets an old probability table from the HW, and then generates a new probability table according to the old probability table and the count table.

As mentioned above, the count information collection unit 212 shown in FIG. 2 collects the count information CNT_info generated from the entropy processing unit 202, where the count information CNT_info is converted into count table contents used for generating the count table CNT_table. In this embodiment, the count table CNT_table records a plurality of count values that correspond to different contexts and associated different syntax settings for different syntax types, respectively, where each count value records a number of occurrence times of one corresponding context and one corresponding associated syntax setting for one corresponding syntax type. In this embodiment, the count information CNT_info is designed to include indication values each indicative of one context and one associated syntax setting for one syntax type. In one exemplary count information implementation, each of the indication values included in the count information CNT_info is set by one identifier (ID). Hence, when generating the count information CNT_info, the entropy processing unit 202 of the hardware entropy engine 115/113 assigns different identifiers to different contexts and different associated syntax settings for different syntax types, respectively.

It should be noted that the term "syntax setting" may mean one particular syntax value or may mean any syntax value(s) within a particular syntax value range, depending upon the actual design considerations. For clarity and simplicity, one "syntax setting" mentioned in the following count information conversion example may be one particular syntax value. However, this is for illustrative purposes only, and is not meant to be a limitation of the present invention.

Figure 7:
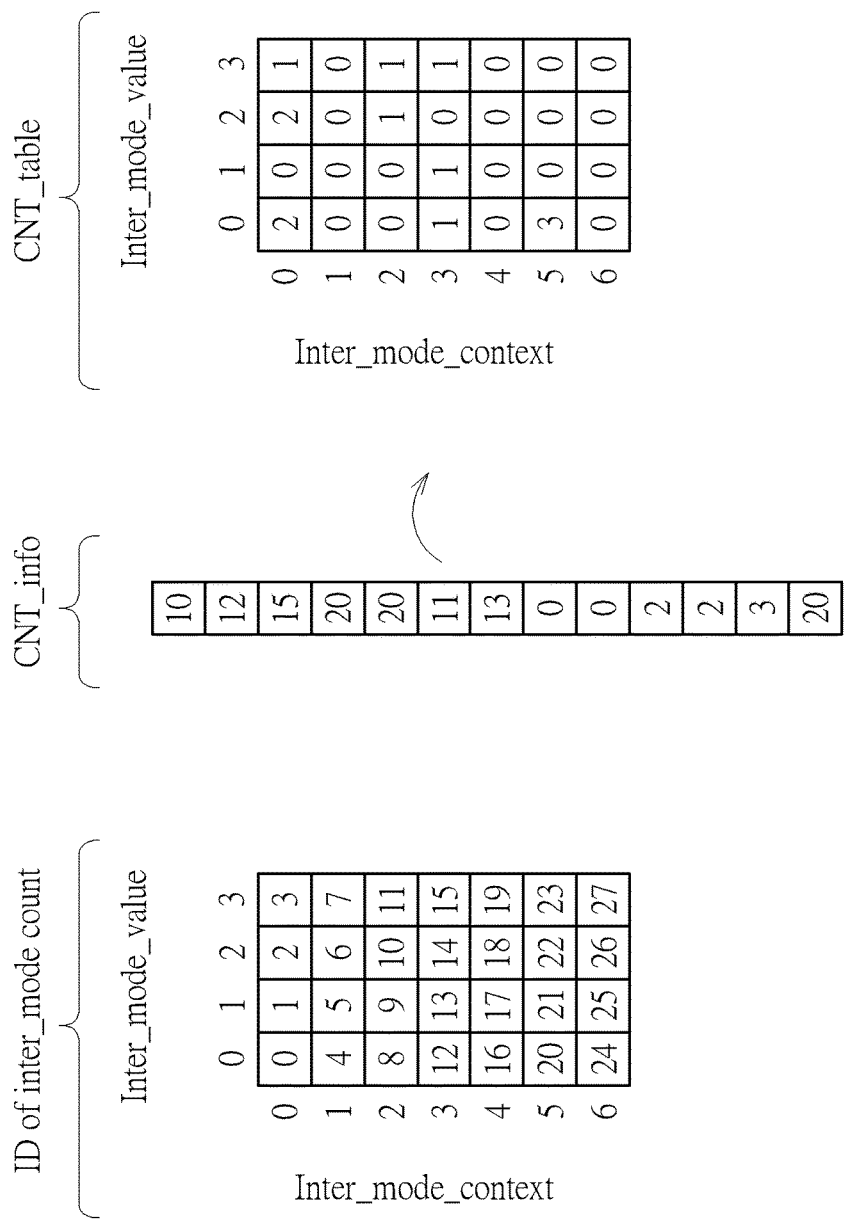
FIG. 7 is a diagram illustrating an operation of converting count information composed of identifiers into a count table according to an embodiment of the present invention.

FIG. 7 is a diagram illustrating an operation of converting count information composed of identifiers into a count table according to an embodiment of the present invention. Suppose that one of the different syntax types is inter_mode. Hence, a count table CNT_table for the inter_mode syntax type has a plurality of inter mode contexts [0, 1, 2, 3, 4, 5, 6], each associated with a plurality of inter mode values [0, 1, 2, 3]. In this example, the entropy processing unit 202 of the hardware entropy engine 115/113 assigns 7×4 identifiers to 7×4 context and syntax setting combinations for the inter_mode syntax type, where the 7×4 context and syntax setting combinations are indexed by inter_mode[Inter_mode_context][Inter_mode_value]. For example, the context and syntax setting combination of inter_mode[0][0] is assigned with an identifier "0", the context and syntax setting combination of inter_mode[0][1] is assigned with an identifier "1", the context and syntax setting combination of inter_mode[0][2] is assigned with an identifier "2", the context and syntax setting combination of inter_mode[0][3] is assigned with an identifier "3", and so on. Consider a case where the context and syntax setting combinations of inter_mode[2][2], inter_mode[3][0], inter_mode[3][3], inter_mode[5][0], inter_mode[5][0], inter_mode[2][3], inter_mode[3][1], inter_mode[0][0], inter_mode[0][0], inter_mode[0][2], inter_mode[0][2], inter_mode[0][3], and inter_mode[5][0] are entropy processed (e.g., entropy encoded/decoded) by the entropy processing unit 202 of the hardware entropy engine 115/113, the count information CNT_info generated from the entropy processing unit 202 and collected by the count information collection unit 212 includes identifiers "10", "12", "15", "20", "20", "11", "13", "0", "0", "2", "2", "3" and "20". After obtaining the count information CNT_info, the CPU 102 (particularly, the software program PROG running on the CPU 102) converts the count information CNT_info into count table contents of the count table CNT_table.

Each of the count table contents is a count value that records the number of occurrence times of one corresponding context and one corresponding associated syntax setting for one corresponding syntax type. Specifically, one count value recorded in the count table CNT_table is set according to the number of same identifiers included in the count information CNT_info. Since the count information CNT_info includes two identifiers "0", the count value of inter_mode[0][0] is set by 2. Since the count information CNT_info includes two identifiers "2", the count value of inter_mode[0][2] is set by 2. Since the count information CNT_info includes one identifier "3", the count value of inter_mode[0][3] is set by 1. Since the count information CNT_info includes one identifier "10", the count value of inter_mode[2][2] is set by 1. Since the count information CNT_info includes one identifier "11", the count value of inter_mode[2][3] is set by 1. Since the count information CNT_info includes one identifier "12", the count value of inter_mode[3][0] is set by 1. Since the count information CNT_info includes one identifier "13", the count value of inter_mode[3][1] is set by 1. Since the count information CNT_info includes one identifier "15", the count value of inter_mode[3][3] is set by 1. Since the count information CNT_info includes three identifiers "20", the count value of inter_mode[5][0] is set by "3". The remaining count values of the count table CNT_table are set by 0's due to no corresponding context and syntax settings encoded/decoded.

Figure 8:
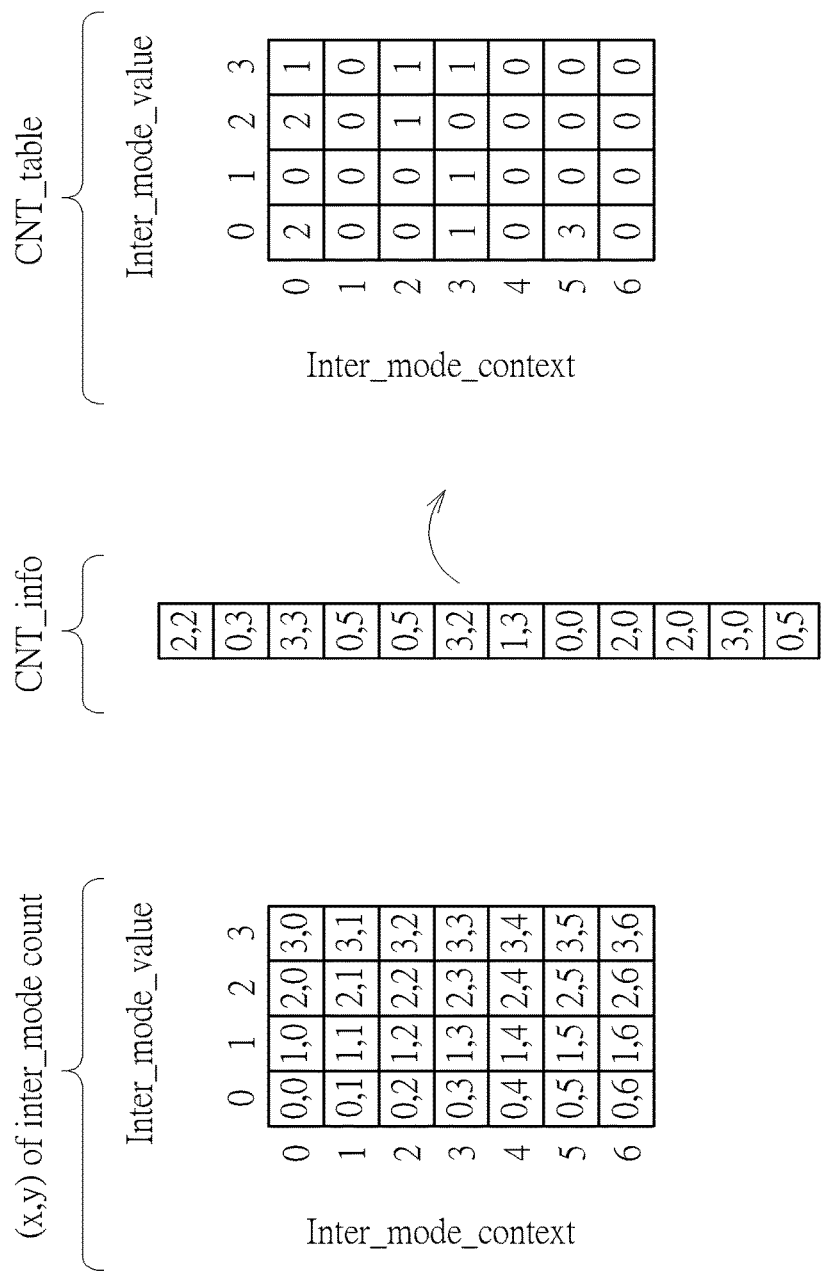
FIG. 8 is a diagram illustrating an operation of converting count information composed of coordinates into a count table according to an embodiment of the present invention.

In the example shown in FIG. 7, indication values included in the count information CNT_info are identifiers. However, this is for illustrative purposes only, and is not meant to be a limitation of the present invention. In another exemplary count information implementation, each of the indication values included in the count information CNT_info is set by one coordinate. FIG. 8 is a diagram illustrating an operation of converting count information composed of coordinates into a count table according to an embodiment of the present invention. The entropy processing unit 202 of the hardware entropy engine 115/113 assigns 7×4 coordinates (e.g., (x, y)=(Inter_mode_value, Inter_mode_context)) to 7×4 context and syntax setting combinations for the inter_mode syntax type, where the 7×4 context and syntax setting combinations are indexed by inter_mode [Inter_mode_context][Inter_mode_value]. For example, the context and syntax setting combination of inter_mode[0][0] is assigned with a coordinate (0, 0), the context and syntax setting combination of inter_mode[0][1] is assigned with a coordinate (1, 0), the context and syntax setting combination of inter_mode[0][2] is assigned with a coordinate (2, 0), the context and syntax setting combination of inter_mode[0][3] is assigned with a coordinate (3, 0), and so on. Consider a case where the context and syntax setting combinations of inter_mode[2][2], inter_mode[3][0], inter_mode[3][3], inter_mode[5][0], inter_mode[5][0], inter_mode[2][3], inter_mode[3][1], inter_mode[0][0], inter_mode[0][0], inter_mode[0][2], inter_mode[0][2], inter_mode[0][3], and inter_mode[5][0] are entropy processed (e.g., entropy encoded/decoded) by the entropy processing unit 202 of the hardware entropy engine 115/113, the count information CNT_info generated from the entropy processing unit 202 and collected by the count information collection unit 212 includes coordinates (2, 2), (0, 3), (3, 3), (0, 5), (0, 5), (3, 2), (1, 3), (0, 0), (0, 0), (2, 0), (2, 0), (3, 0) and (0, 5). After obtaining the count information CNT_info, the CPU 102 (particularly, the software program PROG running on the CPU 102) converts the count information CNT_info into count table contents of the count table CNT_table.

Each of the count table contents is a count value that records the number of occurrence times of one corresponding context and one corresponding associated syntax setting for one corresponding syntax type. Specifically, one count value recorded in the count table CNT_table is set according to the number of same coordinates included in the count information CNT_info. Since the count information CNT_info includes two coordinates (0, 0), the count value of inter_mode[0][0] is set by 2. Since the count information CNT_info includes two coordinates (2, 0), the count value of inter_mode[0][2] is set by 2. Since the count information CNT_info includes one coordinate (3, 0), the count value of inter_mode[0][3] is set by 1. Since the count information CNT_info includes one coordinate (2, 2), the count value of inter_mode[2][2] is set by 1. Since the count information CNT_info includes one coordinate (3, 2), the count value of inter_mode[2][3] is set by 1. Since the count information CNT_info includes one coordinate (0, 3), the count value of inter_mode[3][0] is set by 1. Since the count information CNT_info includes one coordinate (1, 3), the count value of inter_mode[3][1] is set by 1. Since the count information CNT_info includes one coordinate (3, 3), the count value of inter_mode[3][3] is set by 1. Since the count information CNT_info includes three identifiers (0, 5), the count value of inter_mode[5][0] is set by "3". The remaining count values of the count table CNT_table are set by 0's due to no corresponding contexts encoded/decoded.

Figure 9:
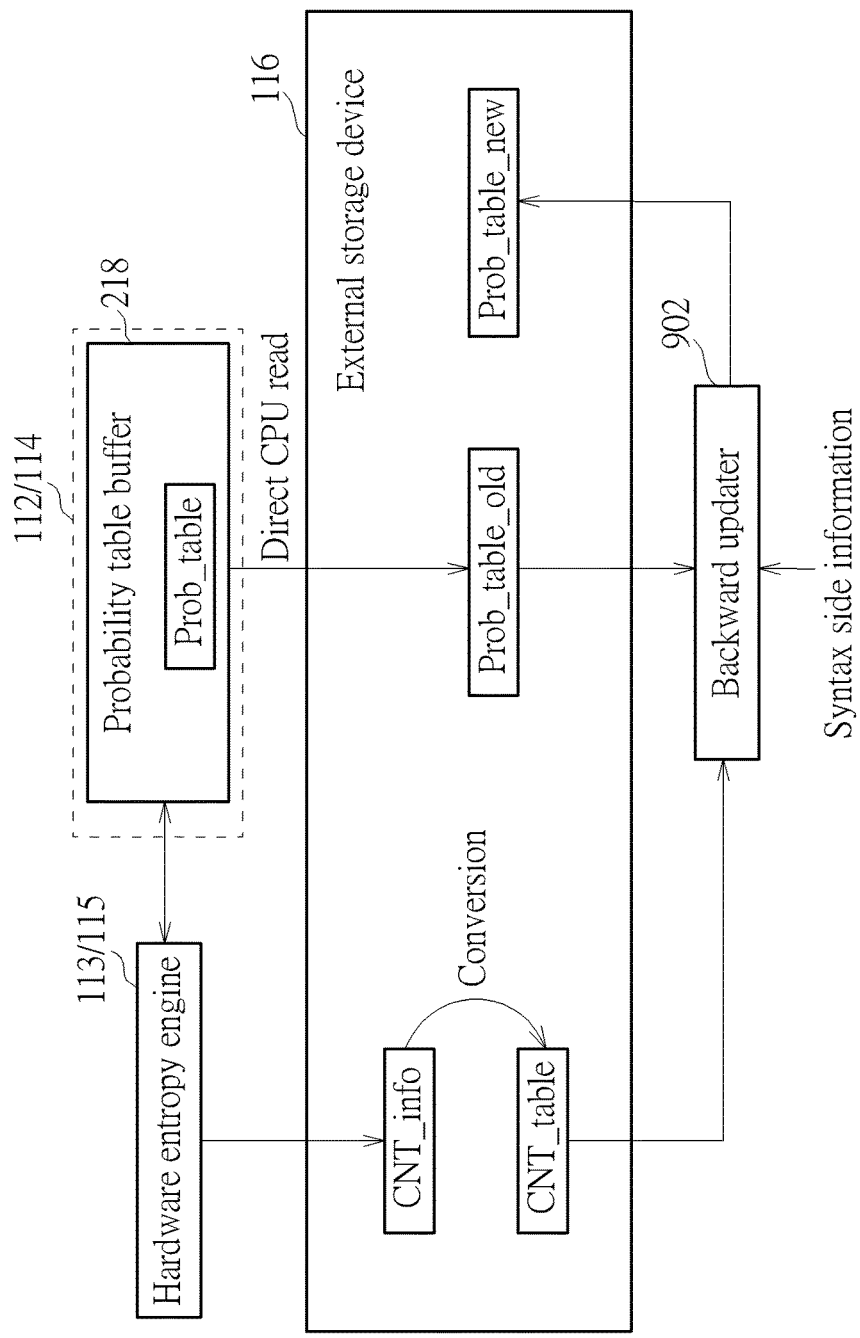
FIG. 9 is a diagram illustrating a first backward adaptation design according to an embodiment of the present invention.

As shown in FIG. 2, the probability table Prob_table is stored in the probability table buffer 218 allocated in the internal storage device 114/112, and the count table CNT_table is stored in the external storage device 116. When the software-based backward probability table update is executed, the probability table Prob_table needs to be loaded into the external storage device 116 for processing. FIG. 9 is a diagram illustrating a first backward adaptation design according to an embodiment of the present invention. The CPU 102 may directly read the probability table Prob_table from the probability table buffer 218 of the internal storage device 114/112 to the external storage device 116, where the probability table Prob_table currently used may act as an old probability table Prob_table_old to be updated. The backward updater 902 is a module of the software program PROG. When the backward updater 902 is executed by the CPU 102, backward adaptation is performed upon the old probability table Prob_table_old in the external storage device 116 according to the count table CNT_table in the external storage device 116 and syntax side information (e.g., syntax type), such that a new probability table Prob_table_new is generated in the external storage device 116 and can be selectively used by the hardware entropy engine 115/113 for entropy processing (e.g., entropy encoding/decoding) of the next picture.

Figure 10:
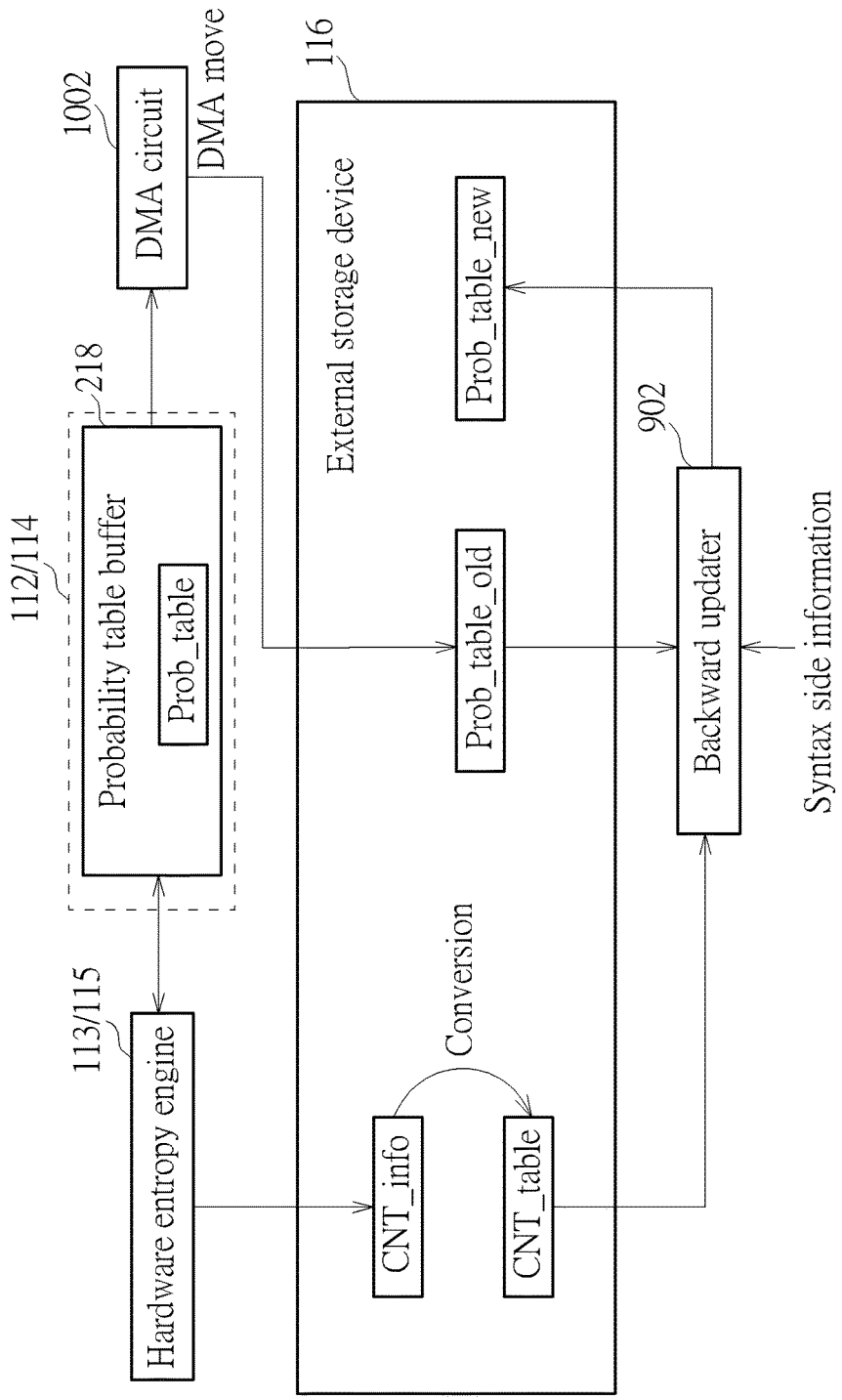
FIG. 10 is a diagram illustrating a second backward adaptation design according to an embodiment of the present invention.

FIG. 10 is a diagram illustrating a second backward adaptation design according to an embodiment of the present invention. The video processing apparatus (e.g., video encoder 106/video decoder 104) may further include a direct memory access (DMA) circuit 1002. The DMA circuit 1002 is arranged to transmit the probability table Prob_table from the probability table buffer 218 of the internal storage device 114/112 to the external storage device 116 without intervention of the CPU 102. The probability table Prob_table currently used may act as an old probability table Prob_table_old to be updated. The backward updater 902 is a module of the software program PROG. When the backward updater 902 is executed by the CPU 102, backward adaptation is performed upon the old probability table Prob_table_old in the external storage device 116 according to the count table CNT_table in the external storage device 116 and syntax side information (e.g., syntax type), such that a new probability table Prob_table_new is generated in the external storage device 116 and can be selectively used by the hardware entropy engine 115/113 for entropy processing (e.g., entropy encoding/decoding) of the next picture.

In some embodiments of the present invention, the probability table Prob_table is completely loaded into the internal storage device 114/112 for entropy encoding/decoding. Loading the whole probability table Prob_table into the internal storage device 114/112 may require a large buffer size. However, it is possible that not all of table contents in the probability table Prob_table are needed by entropy encoding/decoding of one picture. The present invention further proposes only loading a needed portion of the probability table Prob_table into the internal storage device 114/112 for entropy encoding/decoding. In this way, when one picture is being entropy encoded/decoded, a size of a probability table buffer allocated in the internal storage device 114/112 may be reduced, thereby allowing the internal storage device 114/112 to have more free storage space available to other functions of the video encoder 106/video decoder 104.

Figure 11:
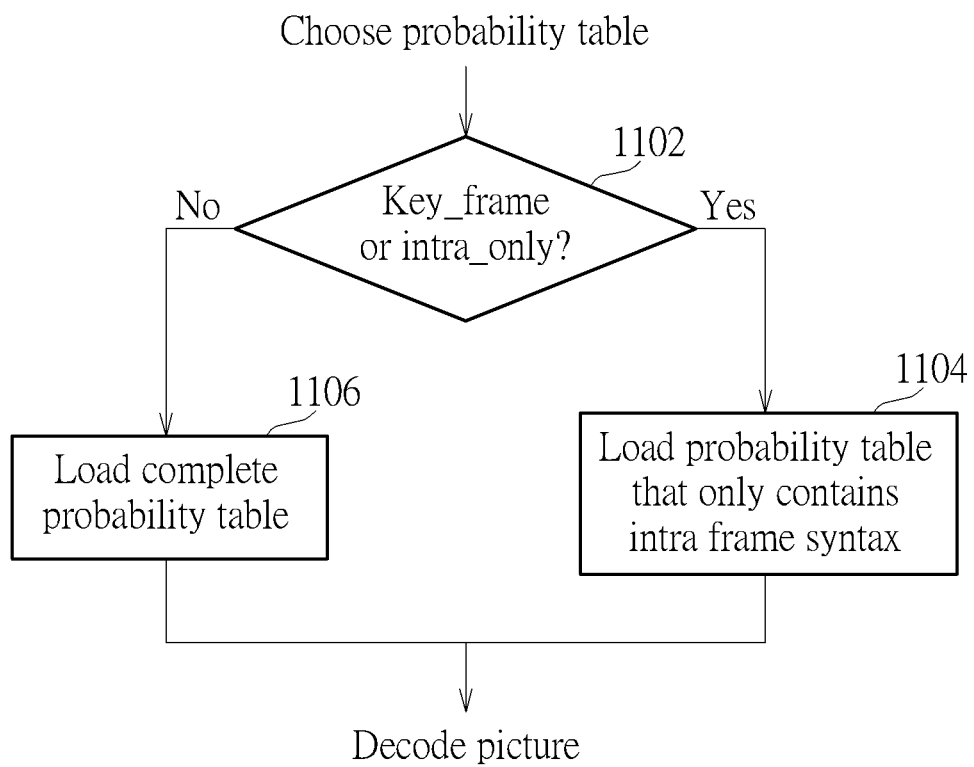
FIG. 11 is a flowchart illustrating a probability table loading method according to an embodiment of the present invention.

FIG. 11 is a flowchart illustrating a probability table loading method according to an embodiment of the present invention. At step 1102, it is checked to judge if the current picture is key_frame or intra_only. When the current frame is not key_frame or intra_only, the flow proceeds with step 1106. At step 1106, the complete probability table is loaded. When the current frame is key_frame or intra_only, the flow proceeds with step 1104. At step 1104, a partial probability table (e.g., a probability table that only contains intra frame syntax) is loaded. FIG. 12 is a diagram illustrating a complete probability table and a partial probability table according to an embodiment of the present invention. The sub-diagram (A) shows a complete probability table Prob_table including probability contents of intra frame syntax and inter frame syntax such as "partition_mode", "tx_related", "intra_mode", "inter_mode related", "filter_mode", "ref_frame_mode" and "motion vector related". The sub-diagram (B) shows a partial probability table Prob_table_intra that only contains probability contents of intra frame syntax such as "partition_mode", "tx_mode" and "intra_mode". When the current picture is an intra picture, the partial probability table Prob_table_intra is loaded for entropy encoding/decoding of the intra picture. Since the complete probability table Prob_table is not required to be loaded for entropy encoding/decoding of the intra picture, the probability table storage requirement for entropy encoding/decoding of the intra picture can be reduced.

Figure 13:
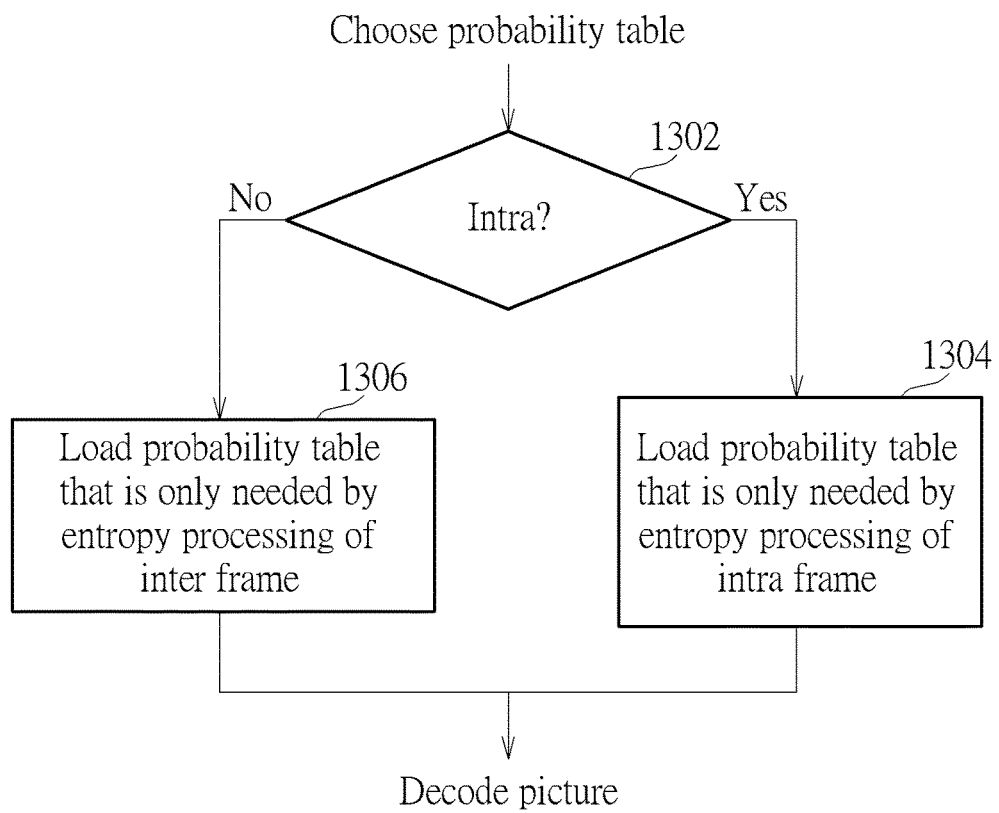
FIG. 13 is a flowchart illustrating another probability table loading method according to an embodiment of the present invention.

As shown in FIG. 12, the partial probability table Prob_table_intra is a part of the complete probability table Prob_table. However, this is for illustrative purposes only, and is not meant to be a limitation of the present invention. For example, a probability table that only contains intra frame syntax may have table contents not included in a probability table that only contains inter frame syntax. For another example, a probability table that only contains inter frame syntax may have table contents not included in a probability table that only contains intra frame syntax. For yet another example, a probability table that only contains intra frame syntax and a probability table that only contains inter frame syntax may be partially same and partially different. FIG. 13 is a flowchart illustrating another probability table loading method according to an embodiment of the present invention. At step 1302, it is checked to judge if the current picture is an intra picture. When the current frame is an intra picture, the flow proceeds with step 1304. At step 1304, a probability table that only contains intra frame syntax is loaded for entropy encoding/decoding of the intra picture. When the current frame is an inter picture, the flow proceeds with step 1306. At step 1306, a probability table that only contains inter frame syntax is loaded for entropy encoding/decoding of the intra picture.

To put it simply, the frame type and/or the frame level syntax may be checked to decide the probability table contents that are actually needed to entropy encode/decode the current picture. Hence, based on the frame type and/or the frame level syntax, a probability table that only contains probability table contents needed to entropy encode/decode the current picture is loaded. Since a complete probability table that includes probability table contents needed to entropy encode/decode the current picture and probability table contents not needed to entropy encode/decode the current picture is not loaded, the probability table storage requirement for entropy encoding/decoding of the current picture can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus comprising:
   an external storage device;
   a hardware entropy engine, external to the external storage device, wherein the hardware entropy engine is arranged to perform entropy processing of a current picture, and further arranged to output count information to the external storage device during the entropy processing of the current picture; and
   a software execution engine, external to the external storage device, wherein when loaded and executed by the software execution engine, a software program instructs the software execution engine to convert the count information into count table contents, and generate a count table in the external storage device according to at least the count table contents, wherein the count table is referenced to apply a backward adaptation to a probability table that is selectively used by the hardware entropy engine to perform entropy processing of a next picture;
   wherein the hardware entropy engine has an internal storage device arranged to store the probability table; and the software execution engine directly reads the probability table from the internal storage device to the external storage device, and performs the backward adaptation upon the probability table in the external storage device according to the count table.

2. The video processing apparatus of claim 1, wherein the software execution engine does not start converting the count information into the count table contents until the current picture is completely processed by the entropy processing; and the count information is full count information of the current picture.

3. The video processing apparatus of claim 1, wherein the software execution engine starts converting the count information into the count table contents before the current picture is completely processed by the entropy processing; and the count information is partial count information of the current picture.

4. The video processing apparatus of claim 3, wherein the software program further instructs the software execution engine to get a hardware status from the hardware entropy engine, where the hardware status is indicative of an amount of the count information; and the software execution engine converts the count information into the count table contents according to the hardware status.

5. The video processing apparatus of claim 4, wherein the software execution engine performs a plurality of conversion iterations during the entropy processing of the current picture; the software execution engine checks the hardware status to determine if the amount of the count information reaches a predetermined value; and the software execution engine performs one of the conversion iterations to convert the count information into the count table contents when the amount of the count information reaches the predetermined value.

6. The video processing apparatus of claim 4, wherein the software execution engine performs a plurality of conversion iterations during the entropy processing of the current picture; and during each of the conversion iterations, the software execution engine converts the count information into the count table contents regardless an amount of the count information available to the conversion iteration.

7. The video processing apparatus of claim 1, wherein the count table records a plurality of count values that correspond to different contexts and associated different syntax settings for different syntax types, respectively, where each count value records a number of occurrence times of one corresponding context and one corresponding associated syntax setting for one corresponding syntax type; and the count information comprises indication values each indicative of one context and one associated syntax setting for one syntax type.

8. The video processing apparatus of claim 7, wherein the hardware entropy engine assigns different identifiers to the different contexts and the associated different syntax settings for the different syntax types, respectively; and each of the indication values is one identifier.

9. A video processing apparatus comprising:
an external storage device;
a hardware entropy engine, external to the external storage device, wherein the hardware entropy engine is arranged to perform entropy processing of a current picture, and further arranged to output count information to the external storage device during the entropy processing of the current picture; and
a software execution engine, external to the external storage device, wherein when loaded and executed by the software execution engine, a software program instructs the software execution engine to convert the count information into count table contents, and generate a count table in the external storage device according to at least the count table contents, wherein the count table is referenced to apply a backward adaptation to a probability table that is selectively used by the hardware entropy engine to perform entropy processing of a next picture;
wherein the hardware entropy engine has an internal storage device arranged to store the probability table; the video processing apparatus further comprises:
a direct memory access (DMA) circuit, arranged to transmit the probability table from the internal storage device to the external storage device; and
the software execution engine performs the backward adaptation upon the probability table in the external storage device according to the count table.

10. The video processing apparatus of claim 1, wherein the hardware entropy engine is further arranged to generate and store a first partial count table in the internal storage device accessible to the hardware entropy engine; and the software program further instructs the software execution engine to generate the count table by combining the first partial count table and a second partial count table, where the second partial count table is generated based on the count table contents converted from the count information.

11. A video processing method comprising:
performing, by a hardware entropy engine, entropy processing of a current picture and outputting count information to an external storage device of the hardware entropy engine during the entropy processing of the current picture; and
executing a software program to convert the count information into count table contents and generate a count table in the external storage device according to at least the count table contents, wherein the count table is referenced to apply a backward adaptation to a probability table that is selectively used by the hardware entropy engine to perform entropy processing of a next picture;
wherein the hardware entropy engine has an internal storage device arranged to store the probability table; and the video processing method further comprises:
executing the software program to directly read the probability table from the internal storage device to the external storage device, and perform the backward adaptation upon the probability table in the external storage device according to the count table.

12. The video processing method of claim 11, wherein execution of the software program does not start converting the count information into the count table contents until the current picture is completely processed by the entropy processing; and the count information is full count information of the current picture.

13. The video processing method of claim 11, wherein execution of the software program starts converting the count information into the count table contents before the current picture is completely processed by the entropy processing; and the count information is partial count information of the current picture.

14. The video processing method of claim 13, wherein the execution of the software program further gets a hardware status from the hardware entropy engine, where the hardware status is indicative of an amount of the count information; and the execution of the software program converts the count information into the count table contents according to the hardware status.

15. The video processing method of claim 14, wherein the execution of the software program performs a plurality of conversion iterations during the entropy processing of the current picture, checks the hardware status to determine if the amount of the count information reaches a predetermined value, and performs one of the conversion iterations to convert the count information into the count table contents when the amount of the count information reaches the predetermined value.

16. The video processing method of claim 14, wherein the execution of the software program performs a plurality of conversion iterations during the entropy processing of the current picture; and during each of the conversion iterations, the execution of the software program converts the count information into the count table contents regardless an amount of the count information available to the conversion iteration.

17. The video processing method of claim 11, wherein the count table records a plurality of count values that correspond to different contexts and associated different syntax settings for different syntax types, respectively, where each count value records a number of occurrence times of one corresponding context and one corresponding associated syntax setting for one corresponding syntax type; and the count information comprises indication values each indicative of one context and one associated syntax setting for one syntax type.

18. The video processing method of claim 17, wherein the hardware entropy engine assigns different identifiers to the different contexts and the associated different syntax settings for the different syntax types, respectively; and each of the indication values is one identifier.

19. The video processing method of claim 11, further comprising:
   generating and storing, by the hardware entropy engine, a first partial count table in the internal storage device accessible to the hardware entropy engine;
   wherein the software program generates the count table by combining the first partial count table and a second partial count table, and the second partial count table is generated based on the count table contents converted from the count information.

* * * * *